United States Patent [19]

Kappler et al.

[11] Patent Number: 5,136,003
[45] Date of Patent: Aug. 4, 1992

[54] HARDENABLE FLUORINATED COPOLYMER, THE PROCESS FOR MAKING THE SAME, AND ITS APPLICATION IN PAINTS AND VARNISHES

[75] Inventors: Patrick Kappler, Ecully; Jean-Luc Perillon, Bernay, both of France

[73] Assignee: Atochem, Puteaux, France

[21] Appl. No.: 779,029

[22] Filed: Oct. 18, 1991

[30] Foreign Application Priority Data

Oct. 19, 1990 [FR] France .................. 90 12969

[51] Int. Cl.⁵ ................ C08F 18/20; C08F 26/00
[52] U.S. Cl. .................................... 526/249
[58] Field of Search ...................... 526/245, 249

[56] References Cited

U.S. PATENT DOCUMENTS 4,931,505  6/1990  Miyazaki et al. ............ 525/160

FOREIGN PATENT DOCUMENTS 180962   5/1986  European Pat. Off. .
2488260  2/1982  France .
2569703  7/1986  France .

*Primary Examiner*—Joseph L. Schofer
*Assistant Examiner*—N. Sarofim

[57] ABSTRACT

A hardenable copolymer containing copolymerization molecular constituents from a fluorinated monomer and an allylic compound, characterized in that:

(a) the fluorinated monomer molecular constituents originate from the combination of tetrafluoroethylene and chlorotrifluoretyhylene, (b) the molecular constituents from the allylic compound originate from an allylic polyol of formula:

$$CH_2=CH-CH_2-O-CH_2-\underset{\underset{R_2}{|}}{\overset{\overset{R_1}{|}}{C}}-CH_2-R_3$$

in which $R_1$ is H or $CH_2OH$, $R_2$ is OH or $CH_2OH$, $R_3$ is $CH_3$ or OH, with the condition that $R_1$ and $R_3$ cannot be simultaneously H and $CH_3$, and that it also contains (c) copolymerization molecular constituents from a vinylic ether of formula:

$$CH_2=CH-O-R$$

in which R is a linear or branched chain alkyl radical with 2 to 13 carbon atoms, and the process of making such copolymers and paints and varnishes containing the same.

5 Claims, No Drawings

HARDENABLE FLUORINATED COPOLYMER, THE PROCESS FOR MAKING THE SAME, AND ITS APPLICATION IN PAINTS AND VARNISHES

BACKGROUND OF THE INVENTION

The present invention pertains to a hardenable or cross-linkable fluorinated copolymer of chlorotrifluoroethylene ($C_2F_3Cl$), tetrafluoroethylene ($C_2F_4$), a nonhydroxylated vinylic ether and an allylic polyol. This copolymer is soluble in organic solvents and is particularly recommended for the fabrication of paints and varnishes.

The fluorinated polymers are known for their good mechanical properties and their excellent resistance to chemical products and weather. However, their lack of solubility in conventional solvents prevents their use for certain applications such as resins for coatings such as paints and varnishes where their properties are desired for the production of coatings and good resistance and easy maintenance.

In order to take advantage of the properties of the fluorinated polymess while avoiding their drawbacks, attempts have been made to make them soluble in the conventional organic solvents. In order to accomplish this, it is known to diminish the crystallinity of the fluorinated polymers by copolymerization of ethylenically unsaturated monomers, at least one of which is fluorinated. In addition, for the use of these copolymers it is desirable for certain applications, particularly when employing them in the fabrication of paints and varnishes, to preserve a sufficient degree of rigidity and to make them hardenable by incorporating functional groups in their structure.

Under these conditions, homopolymers containing only $C_2F_4$ or $C_2F_3Cl$ are totally insoluble in the usual solvents, taking into account their capacity for crytallization. In order to make copolymers of $C_2F_4$ or $C_2F_3Cl$ soluble it is necessary to incorporate in the composition of the final copolymer a noteworthy amount of nonfluorinated monomer. Good solubility in conventional solvents is necessary for producing paints and varnishes with high dry extract and low viscosity in order to factiliate application.

In order to provide these copolymers with this solubility and to make them hardenable, copolymerization is carried out with at least one fluorinated monomer and one ethylenically unsaturated monomer with a functional group, usually selected to be the hydroxy group because it cross-links readily with isocyanates or melamine-formaldehyde resins.

Fluorinated copolymers based on $C_2F_4$ or $C_2F_3Cl$ which are soluble in conventional solvents and have hydroxy functional groups are described in French Patents 2,488,260 and 2,569,703 as well as in EP 180,962.

The copolymers described in French Patent 2,488,260 are a combination of $C_2F_4$ and/or $C_2F_3Cl$ with hydroxylated vinylic ethers. The level of fluorinated olefins in accordance with the technique described does not exceed 60 mole % and is advantageously about 50 mole %, taking into account the alternation of fluorinated and nonfluorinated structural units.

The copolymers described in French patent 2,569,703 are characterized by the combination of $C_2F_3Cl$ with a vinylic ester; the functional group is provided by a monohydroxylated allylic derivative.

The copolymers described in EP 180,962 are characterized by the combination of any fluoroolefin with a vinylic ester. The functional group is provided by a hydroxylated vinylic ether.

In the last two documents, the presence of the vinylic ester is necessary to make the copolymer soluble. The amount of vinylic ester required to obtain good solubility is generally high: up to 70 and 60 mole %.

The strong tendency towards homopolymerization of the monomers of the vinylic ester type makes inevitable the presence of neighboring sequences of vinylic esters, which has a very negative impact on the aging qualities of the coatings; i.e., paints and varnishes.

SUMMARY OF THE INVENTION

The object of the present invention is a copolymer that is easily hardenable, possibly in the presence of a hardening agent. This copolymer exhibits excellent long-term aging performance and, despite a high level of fluorine provided by $C_2F_4$ or $C_2F_3Cl$ in noteworthy amounts, it has excellent solubility in solvents, good compatibility with hardeners of the melamine-formaldehyde resin or polyisocyanate type and good adhesion on conventional substrates.

The hardenable copolymer in accordance with the invention which contains copolymerization molecular constituents from a fluorinated monomer and an allylic compound is characterized in that:

(a) the fluorinated monomer molecular constituents originate from the combination of tetrafluoroethylene and chlorotrifluoroethylene, (b) the molecular constituents from the allylic compound originate from an allylic poyol of formula:

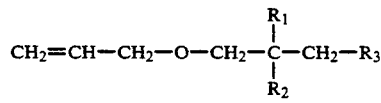

in which $R_1$ is H or $CH_2OH$, $R_2$ is OH or $CH_2OH$, $R_3$ is $CH_3$ or OH, with the proviso that $R_1$ and $R_3$ cannot be simultaneously H and $CH_3$, and that it also contains (c) copolymerization molecular constituents from a vinylic ether of formula:

in which R is a linear or branched chain alkyl radical with 2 to 13 carbon atoms.

The invention also comprises the process of making the copolymer and coating compositions containing such copolymer.

DETAILED DESCRIPTION

The fluorinated hardenable copolymer is preferably characterised in that it contains for each 100 moles of the totality of the ethylenically unsaturated molecular constituents comprising it, molecular constituents of:

(a) 62 to 75 moles representing the sum of $C_2F_4$ and $C_2F_3Cl$ with the molar ratio $C_2F_4:C_2F_3Cl$ being from 0.5 to 1.5, (b) 4 to 15 moles of allylic polyol, and (c) 10 to 30 moles of vinylic ether.

Among the preferred allylic polyols, 3-allyloxy-1,2-propanediol and trimethylolpropanemonoallyl ether can be mentioned.

Among the preferred vinylic ethers, butylvinyl ether, isobutylvinyl ether, propyl and isopropylvinyl ether can be mentioned.

In order to be able to use these copolymers in a liquid coating composition, such as a paint or varnish, it is recommended that the inherent viscosity of the copolymer dissolved in dimethylformamide at 25° C. at a concentration of 1 g/dL be between the values of 0.06 and 0.9 dL/g, and preferably between 0.06 and 0.3 dL/g.

The known copolymers with more than 60% of their structural units originating from $C_2F_4$ and/or $C_2F_3Cl$ are generally poorly soluble in the conventional solvents of the ester or ketone type such that it is difficult to create fluid solutions with high dry extract values. As a result of the combination of allylic polyol and vinylic ether in the composition, it is now possible to obtain copolymers with high levels of $C_2F_4$ or $C_2F_3Cl$ which are suitable for use in paints and varnishes.

The copolymer in accordance with the invention is usually obtained in accordance with the known solution polymerization procedure. The procedure is comprised of copolymerizing the ethylenically unsaturated monomers in a solvent medium in the presence of an organosoluble initiator at a temperature between circa 30 and 120° C., and preferably between 40 and 80° C., under a pressure of circa 10 to 80 bars, and preferably between 15 and 40 bars.

In accordance with the invention, the hardenable fluorinated copolymer is obtained by copolymerization of tetrafluoroethylene, chlorotrifluoroethylene, and the previously defined allylic polyol and vinylic ether.

For 100 moles of copolymerized ethylenically unsaturated monomers there are used:

(a) 62 to 75 moles representing the sum of $C_2F_4$ and $C_2F_3Cl$ with the molar ratio $C_2F_4:C_2F_3Cl$ being from 0.5 to 1.5, (b) 4 to 15 moles of allylic polyol, and (c) 10 to 30 moles of vinylic ether.

In accordance with a preferred method of copolymerization, the solvent is heated to the selected reaction temperature in a previously degassed agitated reactor. A mixture of fluorinated monomer as well as an initial fraction of allylic polyol and vinylic ether are then introduced into the reactor.

The amount of monomer mixture to introduce so as to reach the selected reaction pressure depends on the solubility conditions of the fluorinated monomers in the solvent selected. The monomers: solvent weight ratio is generally between 0.1 and 1.

The polymerization initiator is introduced into the reactor when the reaction pressure and reaction temperature have been reached. The formation of copolymer is manifested by a drop in pressure which is compensated for by the addition of fluorinated monomer mixture.

It is possible to add a mixture of fluorinated monomers of a molar composition identical to that which was initially introduced. It is also possible to take into account the inherent reactivities of each monomer and to adjust the composition of the mixture introduced during polymerization so as to create a copolymer which is homogeneous in composition.

The allylic and vinyl ether monomers can also be added during polymerization. They can also be added as a mixture or separately, combined or not combined with the additions of fluorinated monomers.

The allylic and vinyl ether monomers are added in a manner such that the composition of the mixture of fluorinated monomers and allylic and vinyl ether monomers remains constant during the entire duration of the polymerization The addition of the mixture of monomers so as to maintain the pressure is continued for a sufficiently long period of time to reach a dry extract level on the order of 10 to 60%, preferably 15 to 40%.

The residual volatile reactants can be eliminated by degassing.

The solution extracted from the polymerization reactor can be preserved as it is if the polymerization solvent is suitable for the coating, paint or varnish, application. In the contrary case, the solvent can be eliminated by distillation and replaced by a different solvent that is more suitable for the selected type of application. The solution can undergo washing with water so as to eliminate the water-soluble residues formed during copolymerization; these residues would have a negative impact on storage stability.

The solvents selected for the copolymerization reaction must make it possible to dissolve the mixture of monomers while remaining inert in relation to the other reaction components. The solvents are preferably selected from among the acetates and the alcohols. Among the preferred acetates, butyl acetate, isobutyl acetate and ethyl acetate are particularly recommended. Among the preferred alcohols, n-propanol and tertiobutanol can be mentioned.

The copolymerization initiators are known in themselves. They are usually selected from among the radical polymerization initiators such as the perdicarbonates, the perpivalates and the azo compounds; such a diisopropyl or dicyclohexyl percarbonate, tertiobutyl or tertioamyl perpivalate, azobisisobutyronitrile and azobis-2,2-dimethylvaleronitrile.

The molecular weights by number ($\overline{M}n$) of the crosslinkable copolymers obtained are, preferably, between 1,000 and 20,000; they are measured by the steric exclusion chromatographic technique (GPC) after dissolution in dimethylformamide, at room temperature. These GPC measurements are performed on a 3-column WATERS microstyragel apparatus ($10^2$ nm, $10^3$ nm, $10^4$ nm) calibrated with polyethylene glycol standards. Detection is performed with a refractometer.

As such, the copolymer in solvent medium yields a transparent solution. To this solution can be added the desired conventional coating additives such as pigments, fillers, solvents, diluents, rheology modifiers, spreading agents, wetting agents, antifoaming agents, heat- or light-stabilizing agents, adhesion promoters, coresins or cross-linking hardening agents.

The following can be mentioned among the pigments: titanium dioxide, iron oxides, chrome green oxide, cobalt blue, chrome yellow, carbon black or corrosion-inhibiting pigments such as zinc phosphate and aluminum triphosphate.

The following can be mentioned among the solvents or diluents: esters, ketones, propylene glycol ethers and aromatic compounds.

The following can be mentioned among the coresins: arcylic resins, polyesters, polyethers and epoxides.

The following can be mentioned among the cross-linking hardening agents: the possibly etherified melamine-formaldehydes, the free or blocked isocyanates or polyisocyanates, and the organic acids or polyacids or their anhydrides.

The cross-linking temperature of these copolymers is generally between $-20°$ and $+270°$ C. and is essentially dependent on the nature of the hardening agent.

The cross-linking capacity of these fluorinated functional copolymers is determined by means of a solvent-resistant test. A cotton pad soaked in methyl ethyl ketone (MEK) is rubbed with a back-and-forth movement on the coating until the support on which the coating has been placed appears.

A total of more than 50 back-and-forth movements (round trips) indicates good cross-linking; a total of more than 100 back-and-forth movements indicates excellent cross-linking.

The paints and varnishes based on these copolymers can be applied via pneumatic or electrostatic spraying, by dipping, with a brush or with a roller. The copolymers can be applied on metals, wood, glass, ceramics, plastic or even old coatings.

The following nonlimitative examples further illustrate the invention.

EXAMPLE 1

Comparative

Into a 3.3-liter autoclave equipped with effective agitation are introduced after degassing under vacuum: 2 liters of tertiobutanol, 410 g of $C_2F_3Cl$, 301 g of butylvinyl ether and 65 g of 3-allyloxy-1,2-propanediol. The temperature of the autoclave is brought to 70° C. at which temperature is added 10 g of tertiobutyl perpivalate in solution in tertiobutanol. The pressure is circa 4.1 bars. In order to maintain the pressure between 2.5 and 4.6 bars, 45 g of $C_2F_3Cl$, 30 g of butylvinyl ether and 7 g of 3-allyloxy-1,2-propanediol are added.

During a polymerization period of 2 hours, 248 g of $C_2F_3Cl$, 220 g of butylvinyl ether and 38 g of 3-allyloxy-1,2-propanediol are introduced in this same manner. After degassing of the residual $C_2F_3Cl$, the solvent as well as the butylvinyl ether and the unreacted 3-allyoxy-1,2-propanediol are eliminated.

After distillation, 811 g of copolymer is recovered. NMR analysis shows that this copolymer is essentially constituted of $C_2F_3Cl$ structural units and butylvinyl ether. The hydroxy index is determined by chemical determination in a pyridine/phthalic anhydride medium.

The phthalic anhydride solution is prepared by dissolving 140 g of phthalic anhydride and 1 L of pyridine in a glass flask.

One gram of copolymer is introduced into 55 cc of the aforementioned reagent and brought to 95°–100° C. for 1 hour. After cooling, the amount of phthalic anhydride that has disappeared is determined. The determination performed under these conditions did not reveal a significant presence of hydroxy groups in the copolymer. The level of allyloxypropanediol fixed in the copolymer was less than 0.3 mole %.

Test 1

A varnish is prepared by mixing 80 g of the previously described copolymer (in a 50% solution in butyl acetate) with 11.1 g of an etherified melamine-formaldehyde resin at 90% in isobutanol and 0.3 g of p-toulenesulfonic acid.

The solution is applied with a 100-μm spiral applicator on a 0.7-mm degreased chromated aluminum plate then baked at 150° C. for 30 minutes.

The MEK-resistance test required only three back-and-forth strokes before appearance of the substrate showed the lack of cross-linking of the polymer.

EXAMPLE 2

Into a 3.3-liter autoclave equipped with effective agitation are introduced after degassing under vacuum: 2 liters of tertiobutanol, 90 g of butylvinyl ether and 40 g of 3-allyloxy-1,2-propanediol.

The temperature of the autoclave is brought to 70° C. at which temperature is added 280 g of $C_2F_3Cl$ and 240 g of $C_2F_4$, which produces a pressure of 15.1 bars. One then adds 10 g of tertiobutyl perpivalate in solution in tertiobutanol. In order to maintain the pressure at 15 bars, a mixture of $C_2F_4/C_2F_3Cl$ in 50/50 molar proportions is added. Each time that 27 g of the mixture of monomers is added, one immediately adds 3.6 g of 3-allyloxy-1,2-propanediol and 6.8 g of butylvinyl ether. Thus, during a polymerization period of 4.5 hours, 363 g of 50/50 molar $C_2F_4/C_2F_3Cl$ mixture, 46.8 g of 3-allyloxy-1,2-propanediol and 88 g of butylvinyl ether are added in this manner. After 2 hours of polymerization, 15 g of tertiobutyl perpivalate are added to accelerate the kinetics.

After 4.5 hours of polymerization, the autoclave is recooled, the residual fluorinated monomers are degassed and the content of the autoclave is distilled under vacuum. One recovers 645 g of a transparent, viscous copolymer. This copolymer is dissolved in butyl acetate so as to form a 50% copolymer solution. This solution is washed in an excess of water then concentrated so as to bring the solution to 77.5%. The pourability of the copolymer remained high at this elevated concentration.

Hydroxy determination as described in Example 1 yielded a value of $0.9 \cdot 10^{-3}$ equivalent per gram. The inherent viscosity of a solution of the copolymer in dimethylformamide at 25° C. at a concentration of 1 g/dL was 0.086 dL/g.

Fluorine 19 NMR analysis showed the molar composition of the copolymer to be:
$C_2F_4$: 33.5%
$C_2F_3Cl$: 33.5%
butylvinyl ether: 28%
3-allyloxy-1,2-propanediol: 5%

The molecular weight determined by GPC was $\overline{Mn} = 9,900$.

Test 2

A pigment paste was prepared by mixing 150.2 g of the previously described copolymer solution with 29.5 g of butyl acetate and 118 g of titanium dioxide in a ball mill for 30 minutes at 1,500 rpm.

In order to obtain a white paint, 119.8 g of this pigment base was deconcentrated with 13.2 g of the previously described copolymer solution, 12.6 g of a etherified melamine-formaldehyde resin in solution at 90% in isobutanol and 25.6 g of xylene.

This paint was applied with a 125-μm spiral applicator on a 0.7-mm thick degreased chromated aluminum plate. The plate was then baked for 30 minutes at 130° C. which yielded a 32-μm thick film. The paint film resisted more than 100 back-and-forth strokes (round trips) with MEK. It exhibited a pendulum hardness of 170s (measured according to NFT 30016) and a specular gloss at 60° of 69% (measured according to ASTM D 523-85). This gloss was not affected by 1,000 hours of exposure to the Q.U.V., an accelerated aging device in which the effects of sunlight are reproduced by means of four tubes emitting UV-B rays. The temperature during UV exposure is 63° C. A water-condensation devices makes it possible to maintain the humidity rate at 100% during the condensation phase. The temperature of the sample during the condensation phase was 50° C. Condensation and irradiation phases, each lasting 4 hours, are alternated.

The initial adhesion on the support was class 0 (NFT 30038). One hour in boiling water did not affect the adhesion.

Test 3

A pigment paste was prepared by mixing 150.2 g of the previously described copolymer solution with 29.5 g of butyl acetate and 188 g of titanium dioxide in a ball mill for 30 minutes at 1,500 rpm.

In order to obtain a white paint, 119.8 g of this pigment based was deconcentrated with 13.2 g of the previously described copolymer solution, 9.8 g of a trimer of hexamethylene diisocyanate, 0.3 g of a solution of dibutyltin dilaurate (DBTL) at 10% in butyl acetate and 18.6 g of methoxypropanol acetate.

This paint was applied with a 125-$\mu$m spiral applicator to a 0.7-mm thick degreased chromated aluminum plate. The plate was then allowed to dry for 48 hours at room temperature which yielded a 36-$\mu$m thick film. The paint film resisted more than 100 back-and-forth (round trip) strokes with MEK. It exhibited a pendulum hardness of 180s (measured according to NFT 30016) and a specular gloss at 60° of 69% (measured according to ASTM D 523-85). This gloss was not affected by exposure for 1,000 hours to the Q.U.V.

The initial adhesion on the support was class 0 (NFT 30038) which was not affected by 1 hour in boiling water.

Test 4

A pigment paste was prepared by mixing 160 g of the previously described copolymer solution with 30 g of butyl acetate and 16 g of titanium dioxide, 58.6 of cobalt blue and 8.8 g of carbon black in a ball mill for 30 minutes at 1,500 rpm.

In order to obtain a blue paint, 100 g of this pigment base was deconcentrated with 18.9 g of the previously described copolymer solution, 15.2 g of a etherified melamine-formaldehyde resin in solution at 90% in isobutanol, 37.8 g of xylene and 0.2 g of paratoluene sulfonic acid.

This paint was applied with a pneumatic gun on a 0.8-mm thick plate of degreased galvanized steel. The plate was then baked for 30 minutes at 130° C. which yielded a 32-$\mu$m thick film. The paint film resisted more than 100 back-and-forth strokes (round trips) with MEK. It exhibited a pendulum hardness of 185s (measured according to NFT 30016) and a specular gloss at 60° of 65% (measured according to ASTM D523-85) which was not affected after 1,000 hours of exposure to the Q.U.V.

The initial adhesion on the support was class 0 (NFT 30038) which was not affected after 1 hour in boiling water.

EXAMPLE 3

Into a 3.3-liter autoclave equipped with effective agitation are introduced after degassing under vacuum: 2 liters of tertiobutanol, 70 g of butylvinyl ether and 30 g of trimethylolpropanemonoallyl ether.

The temperature of the autoclave is brought to 70° C. at which temperature is added 280 g of $C_2F_3Cl$ and 240 g of $C_2F_4$, which produces a pressure of 15.1 bars. One then adds 10 g of tertiobutyl perpivalate in solution in tertiobutanol. In order to maintain the pressure at 15 bars, a mixture of $C_2F_4/C_2F_3Cl$ in 50/50 molar proportions is added. Each time that 27 g of the mixture of monomers is added, one immediately adds 5.1 g of trimethylolpropanemonoallyl ether and 5.4 g of butylvinyl ether. Thus, during a polymerization period of 6 hours, 363 g of 50/50 molar $C_2F_4/C_2F_3Cl$ mixture, 66 g of trimethylolpropanemonallyl ether and 70 g of butylvinyl ether are added in this manner. After 2 hours of polymerization, 15 g of tertiobutyl perpivalate are added to accelerate the kinetics.

After 6 hours of polymerization, the autoclave is recooled, the residual fluorinated monomers are degassed and the content of the autoclave is distilled under vacuum. One recovers 665 g of a transparent, viscous copolymer. This copolymer is dissolved in butyl acetate so as to form a 50% copolymer solution. This solution is washed in an excess of water and then concentrated so as to bring the solution to 75%. The pourability of the copolymer remained high at this elevated concentration.

Hydroxy determination as described in Example 1 yielded a value of $1.4 \cdot 10^{-3}$ equivalent per gram. The inherent viscosity of a solution of the copolymer in dimethylformamide at 25° C. at a concentration of 1 g/dL was 0.092 dL/g.

Fluorine 19 NMR analysis showed the molar composition of the copolymer to be:
$C_2F_4$: 35%
$C_2F_3Cl$: 35%
butylvinyl ether: 22%
trimethylolpropanemonoallylether: 8%

The molecular weight determined by GPC was $\overline{Mn}=8,000$.

Test 5

A pigment paste was prepared by mixing 180 g of the previously described copolymer solution with 15 g of butyl acetate and 145 g of titanium dioxide in a ball mill for 30 minutes at 1,500 rpm.

In order to obtain a white paint, this pigment base was deconcentrated with 2.9 g of the previously described pigment solution, 7 g of an etherified melamine-formaldehyde resin in solution at 90% in isobutanol and 2 g of xylene.

This paint was applied with a 125-$\mu$m spiral applicator to a 20-mm thick polybutylene terephthalate plate. The plate was then baked for 30 minutes at 130° C. The paint film resisted more than 100 back-and-forth strokes (round trips) with MEK. It exhibited a pendulum hardness of 210s (measured according to NFT 30016) and a specular gloss at 60° of 55% (measured according to ASTM D 523-85) which was not affected after 1,000 hours of exposure to Q.U.V.

The initial adhesion on the support was class 0 (NFT 30038) which was not affected by 1 hour in boiling water.

EXAMPLE 4

Into a 3.3-liter autoclave equipped with effective agitation are introduced after degassing under vacuum: 2 liters of tertiobutanol, 62 g of butylvinyl ether and 76 g of 3-allyloxy-1,2-propanediol.

The temperature of the autoclave is brought to 70° C. at which temperature is added 280 g of $C_2F_3Cl$ and 240 g of $C_2F_4$, which provides a pressure of 15.1 bars. One then adds 10 g of tertiobutyl perpivalate in solution in tertiobutanol. In order to maintain the pressure at 15 bars, a mixture of $C_2F_4/C_2F_3Cl$ in 50/50 molar proportions is added. Each time that 27 g of the mixture of monomers is added, one immediately adds 6.8 g of 3-allyloxy-1,2-propanediol and 4.8 g of butylvinyl ether. Thus, during a polymerization period of 7.5 hours, 350 g of 50/50 molar $C_2F_4/C_2F_3Cl$ mixture, 89 g of 3 allyoxy-1,2-propane diol and 62 g of butylvinylether. After 2 and 4 hours of polymerization, 15 g of tertiobutyl perpivalate are added to accelerate the kinetics.

After 7.5 hours of polymerization, the autoclave is recooled, the residual fluorinated monomers are degassed and the content of the autoclave is distilled under vacuum. One recovers 650,g of a transparent, viscous copolymer. This copolymer is dissolved in butyl acetate so as to form a 50% copolymer solution. This solution is washed in an excess of water and then concentrated so as to bring the solution to 70%. The pourability of the copolymer remained high at this elevated concentration.

Hydroxy determination as described in Example 1 yielded a value of $1.6 \cdot 10^{-3}$ equivalent per gram. The inherent viscosity of a solution of the copolymer in dimethylformamide at 25° C. at a concentration of 1 g/dL was 0.095 dL/g.

Fluorine 19 NMR analysis showed the molar composition of the copolymer to be:

$C_2F_4$: 36%
$C_2F_3Cl$: 36%
butylvinyl ether: 19%
3-allyloxy-1,2-propanediol: 9%

The molecular weight determined by GPC was $\overline{M}n=9,000$.

Test 6

A pigment paste was prepared by mixing 285.7 g of the previously described copolymer solution was 30.3 g of butyl acetate and 184 g of titanium dioxide in a ball mill for 30 minutes at 1,500 rpm.

In order to obtain a white paint, 100 g of this pigment base was deconcentrated with 12.6 g of a trimer of hexamethylene diisocyanate, 0.4 g of DBTL at 10% in butyl acetate and 10 g of methoxy propanol acetate.

This paint was applied with a 125-μm spiral applicator to a 0.7-mm thick degreased chromated aluminum plate. The plate was then baked for 30 minutes at 80° C. The paint film reisted more than 100 back-and-forth strokes (round trips) with MEK. It exhibited a pendulum hardness of 220s (measured according to NFT 30016) and a specular gloss at 60° of 65% (measured to ASTM D 523-85) which was not affected by 1,000 hours of exposure to Q.U.V.

The initial adhesion on the support was class 0 (NFT 30038) which as not affected by 1 hour in boiling water.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A hardenable copolymer containing copolymerization molecular constituents from a fluorinated monomer and an allylic compound, characterized in that:
   (a) the fluorinated monomer molecular constituents originate from the combination of tetrafluoroethylene and chlorotrifluorethylene,
   (b) the molecular constituents from the allylic compound originate from an allylic polyol of formula:

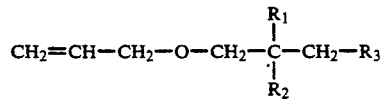

in which $R_1$ is H or $CH_2OH$, $R_2$ is OH or $CH_2OH$, $R_3$ is $CH_3$ or OH, with the proviso that $R_1$ and $R_3$ cannot be simultaneously H and $CH_3$, and that it also contains
   (c) copolymerization molecular constituents from a vinylic ether of formula:

in which R is a linear or branched chain alkyl radical with 2 to 13 carbon atoms; containing for each 100 moles of the totality of the ethylenically unsaturated molecular constituents comprising it, molecular constituents of:
   (a) 62 to 75 moles representing the sum of $C_2F_4$ and $C_2F_3Cl$ with the molar ratio $C_2F_4:C_2F_3Cl$ being from 0.5 to 1.5,
   (b) 4 to 15 moles of allylic polyol; and
   (c) 10 to 30 moles of vinylic ether.

2. The copolymer in accordance with claim 1, characterized in that its inherent viscosity in solution in dimethylformamide at 25° C. at a concentration of 1 g/dL is between 0.06 and 0.9 dL/g.

3. The copolymer in accordance with claim 2, characterized in that it is in solution is in organic solvent.

4. The copolymer in accordance with claim 3, characterized in that the solvent is an alcohol or an acetate.

5. A paint or varnish comprising a hardenable copolymer in accordance with any one of claims 1 or 2 in solution in a solvent.

* * * * *

UNITED STATES PATENT AND TRADEMARK OFFICE
CERTIFICATE OF CORRECTION

PATENT NO. : 5,136,003
DATED : August 4, 1992
INVENTOR(S) : Kappler, et. al.

It is certified that error appears in the above-indentified patent and that said Letters Patent is hereby corrected as shown below:

Column 1, line 24, cancel "polymess" and substitute therefor -- polymers --

Signed and Sealed this

Nineteenth Day of October, 1993

Attest:

BRUCE LEHMAN

*Attesting Officer*     *Commissioner of Patents and Trademarks*